(12) United States Patent
Ashworth et al.

(10) Patent No.: US 10,523,305 B2
(45) Date of Patent: Dec. 31, 2019

(54) VARIABLE CHANNELIZED BANDWIDTH BOOSTER

(71) Applicant: WILSON ELECTRONICS, LLC, St. George, UT (US)

(72) Inventors: Christopher Ken Ashworth, St. George, UT (US); Dale Robert Anderson, Colleyville, TX (US)

(73) Assignee: WILSON ELECTRONICS, LLC, St. George, UT (US)

( * ) Notice: Subject to any disclaimer, the term of this patent is extended or adjusted under 35 U.S.C. 154(b) by 0 days.

(21) Appl. No.: 15/975,550

(22) Filed: May 9, 2018

(65) Prior Publication Data

US 2018/0331752 A1 Nov. 15, 2018

Related U.S. Application Data

(60) Provisional application No. 62/504,871, filed on May 11, 2017.

(51) Int. Cl.
*H04B 7/155* (2006.01)
*H04W 84/04* (2009.01)

(52) U.S. Cl.
CPC ..... *H04B 7/15507* (2013.01); *H04B 7/15535* (2013.01); *H04B 7/15542* (2013.01); *H04W 84/047* (2013.01)

(58) Field of Classification Search
CPC ............ H04B 7/15507; H04B 7/15535; H04B 7/15542; H04W 84/047

(Continued)

(56) References Cited

U.S. PATENT DOCUMENTS 3,621,388 A * 11/1971 Davis ..................... G01R 23/00
324/67
4,569,084 A * 2/1986 Takahama ............ H03B 5/1203
455/131

(Continued)

FOREIGN PATENT DOCUMENTS

| EP | 1525678 B1 | 7/2008 |
| WO | WO 2014085665 A1 | 5/2014 |
| WO | WO 2017060519 A1 | 4/2017 |

OTHER PUBLICATIONS

3GPP2 C.S0011-B; "Recommended Minimum Performance Standards for cdma2000® Spread Spectrum Mobile Stations"; TIA-98-E; (Dec. 13, 2002); 448 pages; Release B, Version 1, Revision E.

(Continued)

*Primary Examiner* — Tan H Trinh
(74) *Attorney, Agent, or Firm* — Thorpe North & Western

(57) ABSTRACT

Technology for a repeater configured to perform variable bandwidth filtering of signals is disclosed. The repeater can include a signal path for a radio frequency (RF) signal. The signal path can include a fixed-bandwidth low pass filter (LPF) operable to perform a variable bandwidth filtering of the RF signal to produce a channelized signal. The variable bandwidth filtering at the LPF can be performed by adjusting a first variable local oscillator (LO). The signal path can include a fixed-bandwidth high pass filter (HPF) operable to perform a variable bandwidth filtering of a channelized signal output from the LPF. The variable bandwidth filtering at the HPF can be performed by adjusting a second variable LO. The first variable LO and the second variable LO can be set to create a variable bandwidth that enables the repeater to perform variable bandwidth filtering of the signals.

33 Claims, 4 Drawing Sheets

(58) Field of Classification Search
USPC ............ 455/7, 13.1, 17, 131, 209, 509, 315, 455/180.1, 169.1; 370/210, 315, 280; 375/327; 382/278
See application file for complete search history.

(56) References Cited

U.S. PATENT DOCUMENTS

| | | | |
|---|---|---|---|
| 4,776,032 A | 10/1988 | Odate et al. | |
| 4,850,038 A * | 7/1989 | Shibata | H03G 3/3068 455/315 |
| 4,989,264 A * | 1/1991 | Ohto | H03G 1/0064 333/178 |
| 5,280,639 A * | 1/1994 | Kubo | H03J 3/32 455/169.1 |
| 5,303,395 A | 4/1994 | Dayani | |
| 5,507,025 A * | 4/1996 | Rodeffer | H03D 7/161 348/726 |
| 5,517,685 A * | 5/1996 | Aoyama | H03L 7/087 331/11 |
| 5,737,687 A | 4/1998 | Martin et al. | |
| 5,777,530 A | 7/1998 | Nakatuka | |
| 5,835,848 A | 11/1998 | Bi et al. | |
| 5,987,304 A * | 11/1999 | Latt | H04B 7/15528 455/17 |
| 6,005,884 A | 12/1999 | Cook et al. | |
| 6,014,366 A * | 1/2000 | Ichiyoshi | H04J 4/005 370/210 |
| 6,201,952 B1 * | 3/2001 | Shimizu | H03D 7/165 455/180.1 |
| 6,711,388 B1 | 3/2004 | Neitiniemi | |
| 6,889,033 B2 | 5/2005 | Bongfeldt | |
| 6,990,313 B1 | 1/2006 | Yarkosky | |
| 7,035,587 B1 | 4/2006 | Yarkosky | |
| 7,092,043 B2 * | 8/2006 | Vorenkamp | H01F 17/0006 257/E27.046 |
| 7,221,967 B2 | 5/2007 | Van Buren et al. | |
| 7,974,573 B2 | 7/2011 | Dean | |
| 10,014,884 B1 * | 7/2018 | Dresser | H04B 1/0014 |
| 10,177,873 B1 * | 1/2019 | Zeng | H03D 7/163 |
| 2001/0016018 A1 * | 8/2001 | Coe | H03D 7/161 375/316 |
| 2002/0012407 A1 * | 1/2002 | Sakurai | H03D 3/008 375/327 |
| 2002/0044021 A1 * | 4/2002 | Van Der Woude | H03H 11/1291 331/74 |
| 2002/0044594 A1 | 4/2002 | Bongfeldt | |
| 2002/0090037 A1 | 7/2002 | Hu et al. | |
| 2003/0123401 A1 | 7/2003 | Dean | |
| 2004/0137854 A1 | 7/2004 | Ge | |
| 2004/0146013 A1 | 7/2004 | Song et al. | |
| 2004/0166802 A1 | 8/2004 | McKay, Sr. et al. | |
| 2004/0219876 A1 | 11/2004 | Baker et al. | |
| 2004/0235417 A1 | 11/2004 | Dean | |
| 2005/0118949 A1 | 6/2005 | Allen et al. | |
| 2006/0084379 A1 | 4/2006 | O'Neill | |
| 2006/0195883 A1 * | 8/2006 | Proctor, Jr. | H03H 15/00 725/127 |
| 2006/0281427 A1 * | 12/2006 | Isaac | H03D 3/008 455/209 |
| 2007/0071128 A1 | 3/2007 | Meir et al. | |
| 2007/0188235 A1 | 8/2007 | Dean | |
| 2008/0081555 A1 | 4/2008 | Kong et al. | |
| 2008/0096483 A1 | 4/2008 | Van Buren et al. | |
| 2008/0278237 A1 | 11/2008 | Blin | |
| 2011/0151775 A1 | 6/2011 | Kang et al. | |
| 2014/0198689 A1 * | 7/2014 | Loh | H04L 27/2601 370/280 |
| 2014/0205203 A1 * | 7/2014 | Lackey | G06K 9/4642 382/278 |
| 2016/0072534 A1 | 3/2016 | Bargroff et al. | |
| 2016/0100294 A1 * | 4/2016 | Ruelke | H04L 5/0016 455/509 |
| 2016/0226460 A1 | 8/2016 | Pullela et al. | |
| 2018/0248676 A1 * | 8/2018 | Raggio | H04L 5/14 |

OTHER PUBLICATIONS

ADL5513; "1 MHz to 4 GHz, 80 dB Logarithmic Detector / Controller"; Data Sheet; (2008); 25 pages.
HMC713LP3E; "54 dB, Logarithmic Detector / Controller, 50-8000 MHz"; Data Sheet; (2010); 12 pages.
HMC909LP3E; "RMS Power Detector Single-Ended, DC—5.8 GHz"; Data Sheet; (2010); 21 pages.
PIC16F873; "28/40-Pin 8-Bit CMOS FLASH Microcontrollers"; Data Sheet; (2001); 218 pages.
International Search Report dated Nov. 13, 2018, in Application No. PCT/US2018/031874, filed May 9, 2018, 4 pages.

* cited by examiner

ND BANDWIDTH
VARIABLE CHANNELIZED BANDWIDTH BOOSTER

RELATED APPLICATIONS

The present application claims the benefit of U.S. Provisional Patent Application No. 62/504,871, filed May 11, 2017 with a, the entire specification of which is hereby incorporated by reference in its entirety for all purposes.

BACKGROUND

Signal boosters and repeaters can be used to increase the quality of wireless communication between a wireless device and a wireless communication access point, such as a cell tower. Signal boosters can improve the quality of the wireless communication by amplifying, filtering, and/or applying other processing techniques to uplink and downlink signals communicated between the wireless device and the wireless communication access point.

As an example, the signal booster can receive, via an antenna, downlink signals from the wireless communication access point. The signal booster can amplify the downlink signal and then provide an amplified downlink signal to the wireless device. In other words, the signal booster can act as a relay between the wireless device and the wireless communication access point. As a result, the wireless device can receive a stronger signal from the wireless communication access point. Similarly, uplink signals from the wireless device (e.g., telephone calls and other data) can be directed to the signal booster. The signal booster can amplify the uplink signals before communicating, via an antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
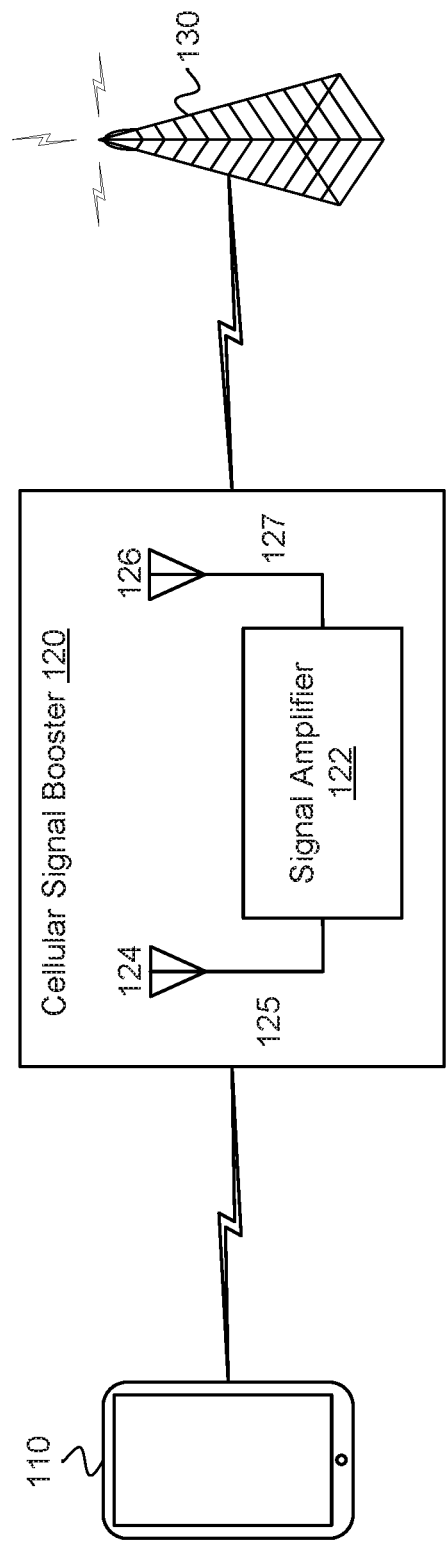
FIG. 1 illustrates a signal booster in communication with a wireless device and a base station in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 illustrates an exemplary signal booster 120 in communication with a wireless device 110 and a base station 130. The signal booster 120 can be referred to as a repeater. A repeater can be an electronic device used to amplify (or boost) signals. The signal booster 120 (also referred to as a cellular signal amplifier) can improve the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the signal booster 120 can amplify or boost uplink signals and/or downlink signals bi-directionally. In one example, the signal booster 120 can be at a fixed location, such as in a home or office. Alternatively, the signal booster 120 can be attached to a mobile object, such as a vehicle or a wireless device 110.

In one configuration, the signal booster 120 can include an integrated device antenna 124 (e.g., an inside antenna or a coupling antenna) and an integrated node antenna 126 (e.g., an outside antenna). The integrated node antenna 126 can receive the downlink signal from the base station 130. The downlink signal can be provided to the signal amplifier 122 via a second coaxial cable 127 or other type of radio frequency connection operable to communicate radio frequency signals. The signal amplifier 122 can include one or more cellular signal amplifiers for amplification and filtering. The downlink signal that has been amplified and filtered can be provided to the integrated device antenna 124 via a first coaxial cable 125 or other type of radio frequency connection operable to communicate radio frequency signals. The integrated device antenna 124 can wirelessly communicate the downlink signal that has been amplified and filtered to the wireless device 110.

Similarly, the integrated device antenna 124 can receive an uplink signal from the wireless device 110. The uplink signal can be provided to the signal amplifier 122 via the first coaxial cable 125 or other type of radio frequency connection operable to communicate radio frequency signals. The signal amplifier 122 can include one or more cellular signal amplifiers for amplification and filtering. The uplink signal that has been amplified and filtered can be provided to the integrated node antenna 126 via the second coaxial cable 127 or other type of radio frequency connection operable to communicate radio frequency signals. The integrated device antenna 126 can communicate the uplink signal that has been amplified and filtered to the base station 130.

In one example, the signal booster 120 can filter the uplink and downlink signals using any suitable analog or digital filtering technology including, but not limited to, surface acoustic wave (SAW) filters, bulk acoustic wave (BAW) filters, film bulk acoustic resonator (FBAR) filters, ceramic filters, waveguide filters or low-temperature cofired ceramic (LTCC) filters.

In one example, the signal booster 120 can send uplink signals to a node and/or receive downlink signals from the node. The node can comprise a wireless wide area network (WWAN) access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one configuration, the signal booster 120 used to amplify the uplink and/or a downlink signal is a handheld booster. The handheld booster can be implemented in a sleeve of the wireless device 110. The wireless device sleeve can be attached to the wireless device 110, but can be removed as needed. In this configuration, the signal booster 120 can automatically power down or cease amplification when the wireless device 110 approaches a particular base station. In other words, the signal booster 120 can determine to stop performing signal amplification when the quality of uplink and/or downlink signals is above a defined threshold based on a location of the wireless device 110 in relation to the base station 130.

In one example, the signal booster 120 can include a battery to provide power to various components, such as the signal amplifier 122, the integrated device antenna 124 and the integrated node antenna 126. The battery can also power the wireless device 110 (e.g., phone or tablet). Alternatively, the signal booster 120 can receive power from the wireless device 110.

In one configuration, the signal booster 120 can be a Federal Communications Commission (FCC)-compatible consumer signal booster. As a non-limiting example, the signal booster 120 can be compatible with FCC Part 20 or 47 Code of Federal Regulations (C.F.R.) Part 20.21 (Mar. 21, 2013). In addition, the signal booster 120 can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R. The signal booster 120 can be configured to automatically self-monitor its operation to ensure compliance with applicable noise and gain limits. The signal booster 120 can either self-correct or shut down automatically if the signal booster's operations violate the regulations defined in FCC Part 20.21.

In one configuration, the signal booster 120 can improve the wireless connection between the wireless device 110 and the base station 130 (e.g., cell tower) or another type of wireless wide area network (WWAN) access point (AP). The signal booster 120 can boost signals for cellular standards, such as the Third Generation Partnership Project (3GPP) Long Term Evolution (LTE) Release 8, 9, 10, 11, 12, or 13 standards or Institute of Electronics and Electrical Engineers (IEEE) 802.16. In one configuration, the signal booster 120 can boost signals for 3GPP LTE Release 13.0.0 (March 2016) or other desired releases. The signal booster 120 can boost signals from the 3GPP Technical Specification 36.101 (Release 12 Jun. 2015) bands or LTE frequency bands. For example, the signal booster 120 can boost signals from the LTE frequency bands: 2, 4, 5, 12, 13, 17, and 25. In addition, the signal booster 120 can boost selected frequency bands based on the country or region in which the signal booster is used, including any of bands 1-70 or other bands, as disclosed in ETSI TS136 104 V13.5.0 (2016-10).

The number of LTE frequency bands and the level of signal improvement can vary based on a particular wireless device, cellular node, or location. Additional domestic and international frequencies can also be included to offer increased functionality. Selected models of the signal booster 120 can be configured to operate with selected frequency bands based on the location of use. In another example, the signal booster 120 can automatically sense from the wireless device 110 or base station 130 (or GPS, etc.) which frequencies are used, which can be a benefit for international travelers.

In one example, the integrated device antenna 124 and the integrated node antenna 126 can be comprised of a single antenna, an antenna array, or have a telescoping form-factor. In another example, the integrated device antenna 124 and the integrated node antenna 126 can be a microchip antenna. An example of a microchip antenna is AMMAL001. In yet another example, the integrated device antenna 124 and the integrated node antenna 126 can be a printed circuit board (PCB) antenna. An example of a PCB antenna is TE 2118310-1.

In one example, the integrated device antenna 124 can receive uplink (UL) signals from the wireless device 100 and transmit DL signals to the wireless device 100 using a single antenna. Alternatively, the integrated device antenna 124 can receive UL signals from the wireless device 100 using a dedicated UL antenna, and the integrated device antenna 124 can transmit DL signals to the wireless device 100 using a dedicated DL antenna.

In one example, the integrated device antenna 124 can communicate with the wireless device 110 using near field communication. Alternatively, the integrated device antenna 124 can communicate with the wireless device 110 using far field communication.

In one example, the integrated node antenna 126 can receive downlink (DL) signals from the base station 130 and transmit uplink (UL) signals to the base station 130 via a single antenna. Alternatively, the integrated node antenna 126 can receive DL signals from the base station 130 using a dedicated DL antenna, and the integrated node antenna 126 can transmit UL signals to the base station 130 using a dedicated UL antenna.

In one configuration, multiple signal boosters can be used to amplify UL and DL signals. For example, a first signal booster can be used to amplify UL signals and a second signal booster can be used to amplify DL signals. In addition, different signal boosters can be used to amplify different frequency ranges.

In one configuration, the signal booster 120 can be configured to identify when the wireless device 110 receives a relatively strong downlink signal. An example of a strong downlink signal can be a downlink signal with a signal strength greater than approximately −80 dBm. The signal booster 120 can be configured to automatically turn off selected features, such as amplification, to conserve battery life. When the signal booster 120 senses that the wireless device 110 is receiving a relatively weak downlink signal, the integrated booster can be configured to provide amplification of the downlink signal. An example of a weak downlink signal can be a downlink signal with a signal strength less than −80 dBm.

In one example, the signal booster 120 can also include one or more of: a waterproof casing, a shock absorbent casing, a flip-cover, a wallet, or extra memory storage for the wireless device. In one example, extra memory storage can be achieved with a direct connection between the signal booster 120 and the wireless device 110. In another example, Near-Field Communications (NFC), Bluetooth v4.0, Bluetooth Low Energy, Bluetooth v4.1, Bluetooth v4.2, Bluetooth 5, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, or IEEE 802.11ad can be used to couple the signal booster 120 with the wireless device 110 to enable data from the wireless device 110 to be communicated to and stored in the extra memory storage that is integrated in the signal booster 120. Alternatively, a connector can be used to connect the wireless device 110 to the extra memory storage.

In one example, the signal booster 120 can include photovoltaic cells or solar panels as a technique of charging the integrated battery and/or a battery of the wireless device 110. In another example, the signal booster 120 can be configured to communicate directly with other wireless devices with signal boosters. In one example, the integrated node antenna 126 can communicate over Very High Frequency (VHF) communications directly with integrated node antennas of other signal boosters. The signal booster 120 can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band. Examples of such ISM bands include 2.4 GHz, 3.6 GHz, 4.9 GHz, 5 GHz, or 5.9 GHz. This configuration can allow data to pass at high rates between multiple wireless devices with signal boosters. This configuration can also allow users to send text messages, initiate phone calls, and engage in video communications between wireless devices with signal boosters. In one example, the integrated node antenna 126 can be configured to couple to the wireless device 110. In other words, communications between the integrated node antenna 126 and the wireless device 110 can bypass the integrated booster.

In another example, a separate VHF node antenna can be configured to communicate over VHF communications directly with separate VHF node antennas of other signal boosters. This configuration can allow the integrated node antenna 126 to be used for simultaneous cellular communications. The separate VHF node antenna can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band.

In one configuration, the signal booster 120 can be configured for satellite communication. In one example, the integrated node antenna 126 can be configured to act as a satellite communication antenna. In another example, a separate node antenna can be used for satellite communications. The signal booster 120 can extend the range of coverage of the wireless device 110 configured for satellite communication. The integrated node antenna 126 can receive downlink signals from satellite communications for the wireless device 110. The signal booster 120 can filter and amplify the downlink signals from the satellite communication. In another example, during satellite communications, the wireless device 110 can be configured to couple to the signal booster 120 via a direct connection or an ISM radio band. Examples of such ISM bands include 2.4 GHz, 3.6 GHz, 4.9 GHz, 5 GHz, or 5.9 GHz.

In traditional solutions, a standard analog channelized signal booster (or repeater) would receive a radio frequency (RF) signal at a given cellular band. The signal would be down converted to an intermediate frequency (IF). A portion of the IF signal would be passed through an IF filter (which effectively achieved channelization of the IF signal). Then the channelized IF signal would be up converted back to an RF signal, and the RF signal would be retransmitted from the signal booster. The RF signal that is retransmitted would correspond to a narrowband portion of the given cellular band. In traditional solutions, the standard analog channelized signal booster would provide a channelized boost of the RF signal.

However, traditional analog channelized signal boosters can have little bandwidth flexibility. The ability to pass different channel widths would typically involve adding switchable IF filters for each desired bandwidth, which would increase cost, circuit board space and complexity. In addition, different cellular carriers can own different amounts of bandwidth in different areas. For example, a certain cellular company can own 2.5 megahertz (MHz) of bandwidth in one area, but can also own 10 or 20 MHz of bandwidth in another area. The traditional analog channelized signal booster would have a 2.5 MHz IF filter, a 10 MHz IF filter and a 20 MHz IF filter. Since the IF filters are relatively expensive and large, it would be desirable to avoid having all of these different IF filters in parallel when generally only one of the IF filters would be used at a given time.

In the present technology, an analog channelized signal booster (or repeater) can create variable channelized bandwidths, which can eliminate the need to switch in and out many different IF filters. The analog channelized signal booster can create the variable channelized bandwidths using a two-stage channelization technique, which results in an input RF signal being channelized twice. The two-stage channelization technique can involve the input RF signal being channelized using a low pass filter (LPF) and then a high pass filter (HPF), or vice versa. The LPF can pass low frequencies and attenuate high frequencies, whereas the HPF can pass high frequencies and attenuate low frequencies. Variable local oscillators (LOs) for the LPF and the HPF can be adjusted accordingly to perform variable bandwidth filtering of the input IF signal at the LPF and the HPF, respectively. In other words, an LPF and HPF bandwidth can be fixed, but the variable LOs can be adjusted, such that a level of signal channelization at the LPF and HPF can be controlled. The usage of the LPF and the HPF with the variable LOs can, in part, result in an ability to pass signals in a desired channel bandwidth. For example, to pass signals in a desired narrow band, the first variable LO can be shifted such that a portion of the signal is cut off at the LPF, and the second variable LO can be shifted such that a portion of the signal is cut off at the HPF, which can result in only signals at the desired narrow band being able to be pass through the analog channelized signal booster. In addition, the analog channelized signal booster can be a carrier-specific or location-specific booster that supports a number of different channel bandwidths.

In one example, during a first stage of the channelization, the analog channelized signal booster can receive an RF signal. The received RF signal can be down converted to create at signal at a first IF frequency. The signal at the first IF frequency can be passed through a first filter (e.g., a LPF). The ability to pass through certain signals at the first filter while attenuating or rejecting other signals can depend on the first variable LO, which can be adjusted accordingly.

Then the signal at the first IF frequency that is output from the first filter can be converted to a signal at a second IF frequency. During a second stage of the channelization, the signal at the second IF frequency can be passed through a second filter (e.g., a HPF). The ability to pass through certain signals at the second filter while attenuating or rejecting other signals can depend on the second variable LO, which can be adjusted accordingly. The signal at the second IF frequency that is output from the second filter can be converted back to an RF signal (at an RF frequency or carrier frequency), and the RF signal can be transmitted from the analog channelized signal booster. The usage of the first filter (e.g., LPF) and then the second filter (e.g., HPF), or vice versa, can result in the analog channelized signal booster being able to only pass through signals within a desired channel bandwidth or narrowband frequency range.

In one example, the analog channelized signal booster can perform variable bandwidth filtering of signals in both an uplink and a downlink direction. In other words, an uplink path of the signal booster can include a LPF and a HPF and corresponding variable LOs. In addition, a downlink path of the signal booster can include a LPF and a HPF and corresponding LOs.

In one example, the analog channelized signal booster can have an ability to create a variable adjustable passband. The variable adjustable passband can be 2.5 MHz, 5, MHz, 10 MHz, 20 MHz, etc. The variable adjustable passband can be created using, in part, the variable LOs. The variable adjustable passband can correspond to any number of passband widths or channel bandwidths or frequencies owned by cellular carriers in different areas.

Figure 2:
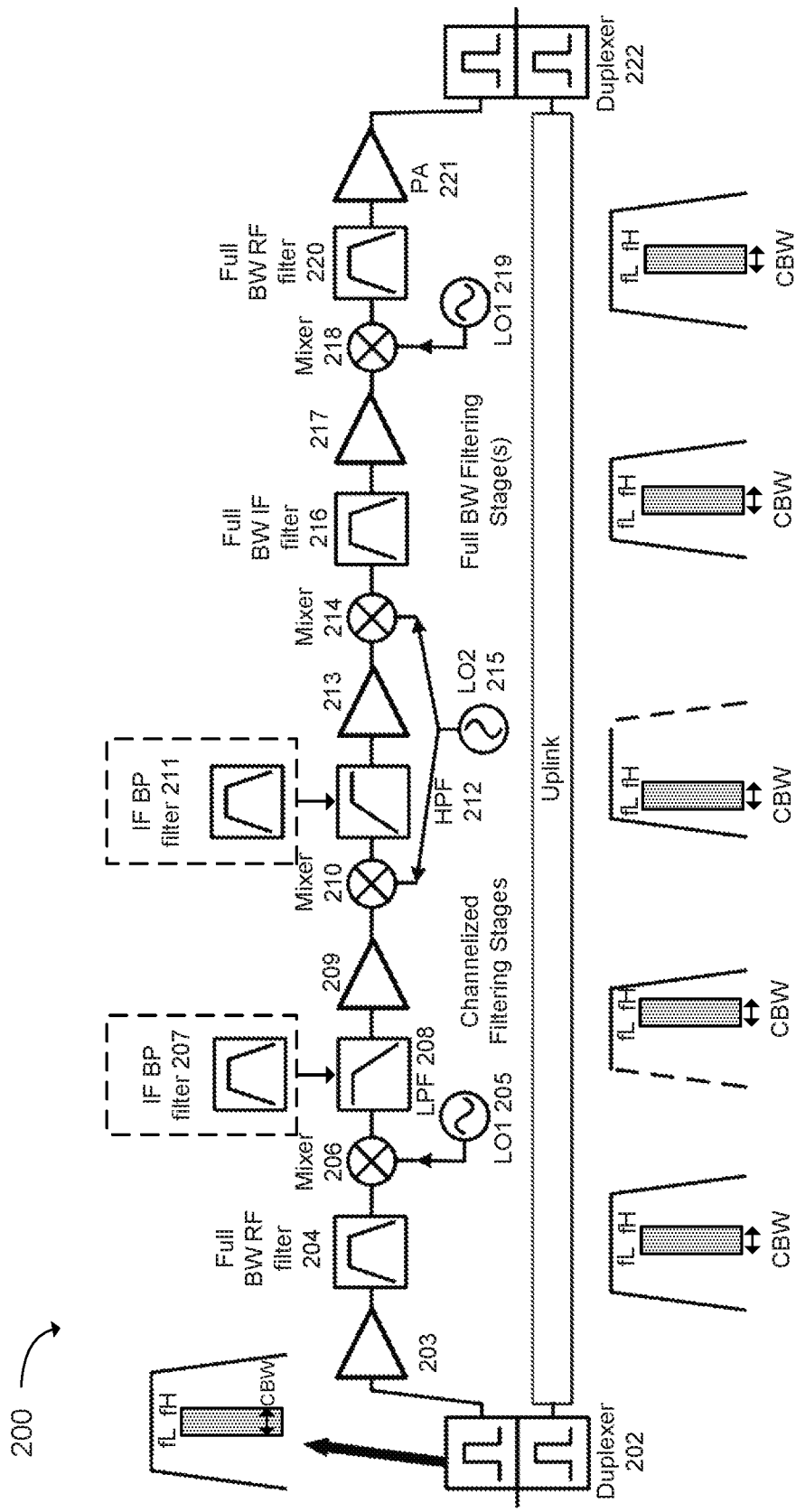
FIG. 2 illustrates a channelized signal booster or repeater for performing variable bandwidth filtering of channelized signals in accordance with an example.

FIG. 2 illustrates an exemplary channelized signal booster 200 or repeater for performing variable bandwidth filtering of channelized signals. The channelized signal booster 200 can be an analog signal booster. The channelized signal booster 200 can include one or more directional signal paths, such as an uplink signal path and/or a downlink signal path. The channelized signal booster 200 can perform the variable bandwidth filtering of signals on the uplink signal path and/or the downlink signal path. In other words, the channelized signal booster 200 can have the ability to create variable channelized bandwidths.

In one example, the channelized signal booster 200 can perform variable bandwidth filtering of channelized signals. The channelized signal booster 200 can include a fixed-bandwidth low pass filter (LPF) 208 operable to perform a variable bandwidth filtering of the an RF signal to produce a channelized signal. The variable bandwidth filtering at the LPF 208 can be performed by adjusting a first variable local oscillator (LO) 205. The channelized signal booster 200 can include a fixed-bandwidth high pass filter (HPF) 212 operable to perform a variable bandwidth filtering of a channelized signal output from the LPF 208. The variable bandwidth filtering at the HPF 212 can be performed by adjusting a second variable LO 215. The first variable LO 205 and the second variable LO 215 can be set to create a variable bandwidth that enables the channelized signal booster 200 to perform variable bandwidth filtering of the channelized signals.

In one configuration, the channelized signal booster 200 can include a first duplexer 202 and a second duplexer 222. The first duplexer 202 can be communicatively coupled to a first antenna or outside antenna (not shown). The second duplexer 222 can be communicatively coupled to a second antenna or inside antenna (not shown). Therefore, the first antenna can receive downlink signals from a base station (not shown), and pass the downlink signals to the first duplexer 202. The second duplexer 222 can pass the downlink signals to the second antenna, which can transmit the downlink signals to a mobile device (not shown). Similarly, the second antenna can receive uplink signals from the mobile device, and pass the uplink signals to the second duplexer 222. The first duplexer 202 can pass the uplink signals to the first antenna, which can transmit the uplink signals to the base station.

In a more specific example, the first duplexer 202 can receive a radio frequency (RF) signal via the first antenna. The first duplexer 202 can direct the RF signal to an appropriate signal path (e.g., uplink or downlink). The RF signal can be passed through a first amplifier 203, such as a low noise amplifier (LNA). The RF signal can be passed through a first full bandwidth RF filter 204. The first full bandwidth RF filter 204 can function to reject out-of-band received signals. The RF signal output from the first full bandwidth RF filter 204 can be provided to a first mixer 206. The first mixer 206 can have three ports—an RF input port (R port), a local oscillator (LO) input port (L port) and an intermediate frequency (IF) output port (I port). The RF signal output from the first full bandwidth RF filter 204 can be provided to the R port of the first mixer 206. The L port of the first mixer 206 can receive an LO signal from the first variable LO 205 (LO1). The LO signal can be set accordingly by adjusting the first variable LO 205. The first mixer 206 can down convert the RF signal output from the first full bandwidth RF filter 204 to form a signal at a first IF. In other words, the signal at the first IF can be output from the I port of the first mixer 206. The signal at the first IF can be provided to the LPF 208, which can filter the signal at the first IF. The signal at the first IF can be filtered using the LPF 208 to form a first channelized signal (at the first IF) based on a combination of a bandwidth of the LPF 208, an LO setting of the first variable LO 205 and an RF frequency of the RF signal. The signal at the first IF can be channelized to form the first channelized signal (at the first IF) when the signal at the first IF is passed through the LPF 208.

In one example, a first channelized signal output (at the first IF) of the LPF 208 can be provided to a second amplifier 209, which can amplify the first channelized signal output. The first channelized signal output from the second amplifier 209 can be provided to a second mixer 210. More specifically, the first channelized signal output can be provided to an R port of the second mixer 210. An L port of the second mixer 210 can receive an LO signal from the second variable LO 215 (LO2). The LO signal can be set accordingly by adjusting the second variable LO 215. The second mixer 210 can convert the first channelized signal output (from the LPF 208 and the second amplifier 209) to form a channelized signal at a second IF. In other words, the channelized signal at the second IF can be output from an I port of the second mixer 210. The channelized signal at the second IF can be provided to the HPF 212, which can filter the channelized signal at the second IF. The channelized signal at the second IF can be filtered using the HPF 212 to form a second channelized signal (at the second IF) based on a combination of a bandwidth of the HPF 212 and an LO setting of the second variable LO 215. In other words, the channelized signal at the second IF can be channelized to form the second channelized signal (at the second IF) when the channelized signal at the second IF is passed through the HPF 212.

In one example, a second channelized signal output (at the second IF) of the HPF 212 can be provided to a third amplifier 213, which can amplify the second channelized signal output. The second channelized signal output from the third amplifier 213 can be provided to a third mixer 214. More specifically, the second channelized signal output can be provided to an R port of the third mixer 214. An L port of the second mixer 210 can receive the LO signal from the second variable LO 215 (LO2). In other words, the same LO signal from the second variable LO 215 (LO2) can be provided to both the second mixer 210 and the third mixer 214. The LO signal can be set accordingly by adjusting the second variable LO 215. The third mixer 214 can convert the second channelized signal output (from the HPF 212 and the third amplifier 213) to form a third channelized signal (at the first IF). The third channelized signal can be output from an I port of the third mixer 214. In other words, the second channelized signal (at the second IF) can be converted to form the third channelized signal (at the first IF).

In one example, the third channelized signal output from the third mixer 214 can be provided to a full bandwidth IF filter 216, which can filter the third channelized signal. The third channelized signal output from the full bandwidth IF filter 216 can be provided to a fourth amplifier 217, which can amplify the third channelized signal output. The third channelized signal output from the fourth amplifier 217 can be provided to a fourth mixer 218. More specifically, the third channelized signal output from the fourth amplifier 217 can be provided to an R port of the fourth mixer 218. An L port of the fourth mixer 218 can receive an LO signal from a first variable LO 219 (LO1). In other words, the same LO signal can be provided to both the first mixer 206 and the fourth mixer 218. The same LO signal (LO1) can be used for down conversion at the first mixer 206 and up conversion at the fourth mixer 218. The LO signal can be set accordingly by adjusting the first variable LO 219. The fourth mixer 218 can convert the third channelized signal output (from the full bandwidth IF filter 216 and the fourth amplifier 217) to form an RF signal at a carrier frequency. In other words, the third channelized signal output (at the first IF) can be converted to form the RF signal at the carrier frequency. The RF signal at the carrier frequency can be provided to a second full bandwidth RF filter 220. The second full bandwidth RF filter 220 can function to reduce noise that would otherwise be amplified at the fourth amplifier 217 and a fifth amplifier 221. A RF signal output of the second full bandwidth RF filter 220 can be provided to the fifth amplifier 221, such as a power amplifier (PA). Then the RF signal output can be provided to the second duplexer 222, and the second duplexer 222 can pass the RF signal at the carrier frequency to the second antenna.

In one example, the first full bandwidth RF filter 204, the LPF 208, the HPF 212, the full bandwidth IF filter 216, the second full bandwidth RF filter 220, and the first and second variable LOs (LO1 and LO2) can function together to enable the channelized signal booster 200 to perform variable bandwidth filtering of signals. The LPF 208 and the HPF 212 can form channelized filtering stages of the channelized signal booster 200. The second full bandwidth IF filter 216 and the full bandwidth RF filter 220 can form full bandwidth filtering stages of the channelized signal booster 200.

In an alternative configuration, a signal at a first IF output from the first mixer 206 can be provided to a HPF (instead of a LPF) to form a first channelized signal (at the first IF). A first channelized signal output of the HPF can be provided to the second mixer 210. The second mixer 210 can convert the first channelized signal output to form a channelized signal at a second IF. The channelized signal at the second IF can be provided to a LPF (instead of a HPF) to form a second channelized signal (at the second IF). A second channelized signal output of the LPF can be provided to the third mixer 214. In other words, in this alternative configuration, the signal can first be provided to the HPF, and then can be provided to the LPF (rather than in the opposite direction).

In one configuration, the first full bandwidth RF filter 204 can be positioned before the LPF 208. The full bandwidth IF filter 216 can be positioned after the HPF 212. The second full bandwidth RF filter 220 can be positioned after the HPF 212 and after the full bandwidth IF filter 216. In an alternative configuration, the full bandwidth IF filter 216 can be positioned before the LPF 208. In other words, the positions of the LPF 208, the HPF 212 and the full bandwidth IF filter 216 can be interchanged accordingly.

In an alternative configuration, the LPF 208 in the channelized signal booster 200 can be replaced with a first IF bandpass filter 207, and the HPF 212 in the channelized signal booster 200 can be replaced with a second IF bandpass filter 211. In this alternative configuration, the first mixer 206 can down convert the RF signal output from the first full bandwidth RF filter 204 to form the signal at a first IF. The signal at the first IF output from the first mixer 206 can be provided to the first IF bandpass filter 207 to form the first channelized signal (at the first IF). A first channelized signal output from the first IF bandpass filter 207 can be provided to the second mixer 210. The second mixer 210 can convert the first channelized signal output to the channelized signal at the second IF. The channelized signal at the second IF output from the second mixer 210 can be provided to the second IF bandpass filter 211 to form the second channelized signal (at the second IF). A second channelized signal output from the second IF bandpass filter 211 can be provided to the third mixer 214. The third mixer 214 can convert the second channelized signal output to form the third channelized signal (at the first IF). The third channelized signal output from the third mixer 214 can be provided to the full bandwidth IF filter 216. The third channelized signal output from the full bandwidth IF filter 216 can be provided to the fourth mixer 218. The fourth mixer 218 can convert the third channelized signal output to the RF signal at the carrier frequency.

In one configuration, the channelized signal booster 200 can receive the RF signal. The channelized signal booster 200 can convert the RF signal to the first channelized signal (at the first IF) using the first mixer 206, the first variable LO 205 and the LPF 208. The channelized signal booster 200 can convert the first channelized signal to the second channelized signal (at the second IF) using the second mixer 210, the second variable LO 215 and the HPF 212. The channelized signal booster 200 can convert the second channelized signal to the third channelized signal (at the first IF) using the third mixer 214 and the second variable LO 215. Then the channelized signal booster 200 can convert the third channelized signal to the RF signal using the fourth mixer 218 and the first variable LO 219.

In an alternative configuration, the channelized signal booster 200 can receive the RF signal. The channelized signal booster 200 can convert the RF signal to the first channelized signal (at the first IF) using the first mixer 206, the first variable LO 205 and the LPF 208. The channelized signal booster 200 can convert the first channelized signal to the second channelized signal (at the second IF) using the second mixer 210, the second variable LO 215 and the HPF 212. The channelized signal booster 200 can convert the second channelized signal to the RF signal using a third mixer and a combination of the first variable LO 205 and the second variable LO 215. The combination of the first variable LO 205 and the second variable LO 215 can effectively create a third LO (LO3). While a standalone LO3 can potentially be synthesized, it can be more accurate to combine the first variable LO 205 and the second variable LO 215. In this alternative configuration, the second channelized signal can be directly converted to the RF signal, rather than converting the second channelized signal (at the second IF) to the third channelized signal (at the first IF) and then to the RF signal. As a result, this alternative configuration provides a solution for converting back to the RF signal using fewer components (e.g., one less mixer), which can be advantageous for the channelized signal booster 200.

More specifically, in the alternative configuration, the first mixer 206 can down convert the RF signal output from the first full bandwidth RF filter 204 to form the signal at the first IF based on the first variable LO 205. The signal at the first IF can be filtered using the LPF 208 to form the first channelized signal (at the first IF). The first channelized signal can be formed based on a combination of a bandwidth of the LPF 208, the LO setting of the first variable LO 208, and the RF frequency of the RF signal. The second mixer 210 can convert the first channelized signal output from the LPF 208 to form the channelized signal at the second IF based on the second variable LO 215. The channelized signal at the second IF can be filtered using the HPF 212 to form the second channelized signal (at the second IF). The second channelized signal can be formed based on a bandwidth of the HPF 212 and an LO setting of the second variable LO 215. A third mixer can convert the second channelized signal output from the HPF 212 to form the RF signal at the carrier frequency. The RF signal at the carrier frequency can be formed based on the LO setting of the first variable LO 208 and the LO setting of the second variable LO 215. In this alternative configuration, there is no fourth mixer because the second channelized signal (at the second IF) can be converted directly back to the RF signal, as opposed to converting the second channelized signal (at the second IF) to the third channelized signal (at the first IF) and then converting back to the RF signal.

In one configuration, the channelized signal booster 200 can perform a variable bandwidth filtering of channelized signals within certain bands. A non-limiting example can be band 25 (B25), which is a relatively wide band that ranges from 1850 MHz to 1915 MHz in the uplink and from 1930 MHz to 1995 MHz in the downlink. Another non-limiting example can be band 2 (B2), which is a relatively wide band that ranges from 1850 MHz to 1910 MHz in the uplink and from 1930 MHz to 1990 MHz in the downlink. Yet another non-limiting example can be band 4 (B4), which ranges from 1710 MHz to 1755 MHz in the uplink and from 2110 MHz to 2155 MHz in the downlink. The variable bandwidth filtering within certain bands can be achieved using a desired channel bandwidth of 2.5 MHz, 5, MHz, 10 MHz, 20 MHz, etc.

As an example, say a desired channel bandwidth is a 10 MHz center of B2 in the uplink, which translates to 1880 MHz±5 MHz. In other words, a variable channel bandwidth can be created to correspond to a frequency range of 1875 MHz to 1885 MHz. An 1880 MHz RF signal can be provided to the first mixer 206. An example of a typical LO frequency (LO1) at the first IF stage can be ±140 MHz. In other words, the 1880 MHz RF signal can be set at the 140 MHz. The 140 MHz can be a desired center IF1 (i.e., the center of where the IF1 lands) with respect to the first IF stage. After the first mixer 206, the RF signal can be converted to an IF1 signal, which can be centered at the 140 MHz. The LO1 can be selected to center the RF signal at IF1. Generally, the RF frequencies, the IF frequencies and the LO frequencies can be carefully selected depending on which bands are on the channelized signal booster 200. Then the IF1 signal can be provided to the second mixer 210. An example of a typical LO frequency (LO2) at the second IF stage can be ±220 MHz. In other words, the IF1 signal can be set at the 220 MHz. The 220 MHz can be a desired center IF2 (i.e., the center of where the IF2 lands) with respect to the second IF stage. After the second mixer 210, the IF1 signal can be converted to an IF2 signal, which can be centered at the 220 MHz. The LO2 can be selected to center the IF1 signal at IF2. In order to transition from the 140 MHz to the 220 MHz, a plus-minus between 140 MHz and 220 MHz (i.e., 80 MHz or 360 MHz) can be used for LO2. Therefore, the bandwidth of the bandpass filters (e.g., LPF 208 and HPF 212), as well as the centering of the bandpass filters, can be controlled in order to achieve the desired channel bandwidth. The LO settings (LO1 and LO2) can be controlled (e.g., shifted by ±5 MHz) in order to achieve the desired channel bandwidth. The LO settings can depend on which part of the full bandwidth RF filter is to be channelized. After the third mixer 214, the IF2 signal can be converted to an IF1 signal, which can be centered at the 140 MHz. The same LO2 (e.g., 80 MHz) can be used to center the IF2 signal at IF1. After the fourth mixer 218, the IF1 signal can be converted back to the RF signal using the same LO1 (e.g., 140 MHz).

In one configuration, the first full bandwidth RF filter 204, the LPF 208, the HPF 212, the full bandwidth IF filter 216 and the second full bandwidth RF filter 220 can each have a center frequency and a passband. For the first full bandwidth RF filter 204, a desired channel bandwidth can be at the center of the full bandwidth RF filter 204 (i.e., at the center of the passband). The desired channel bandwidth or center passband (the shaded portion) can be characterized by a lower cut-off frequency ($F_L$) and a higher cut-off frequency ($F_H$). As a non-limiting example, the desired channel bandwidth or center passband can be 10 MHz. The center passband (e.g., 10 MHz) can be set towards the right side of the LPF 208, which can remove the RF passband that was towards the right side of the first full bandwidth RF filter 204. In other words, the desired channel bandwidth can be set towards the right side of the LPF 208. Then, the center passband (e.g., 10 MHz) can be set towards the left side of the HPF 212, which can remove the RF passband that was towards the left side of the first full bandwidth RF filter 204. In other words, the desired channel bandwidth can be set towards the left side of the HPF 212. After the LPF 208 and the HPF 212, the center passband can remain (as the left and right sides can be essentially removed using the LPF 208 and the HPF 212 and each IF stage). For the full bandwidth IF filter 216 and the second full bandwidth RF filter 220, the desired channel bandwidth can be at the center of the passband.

Figure 3:
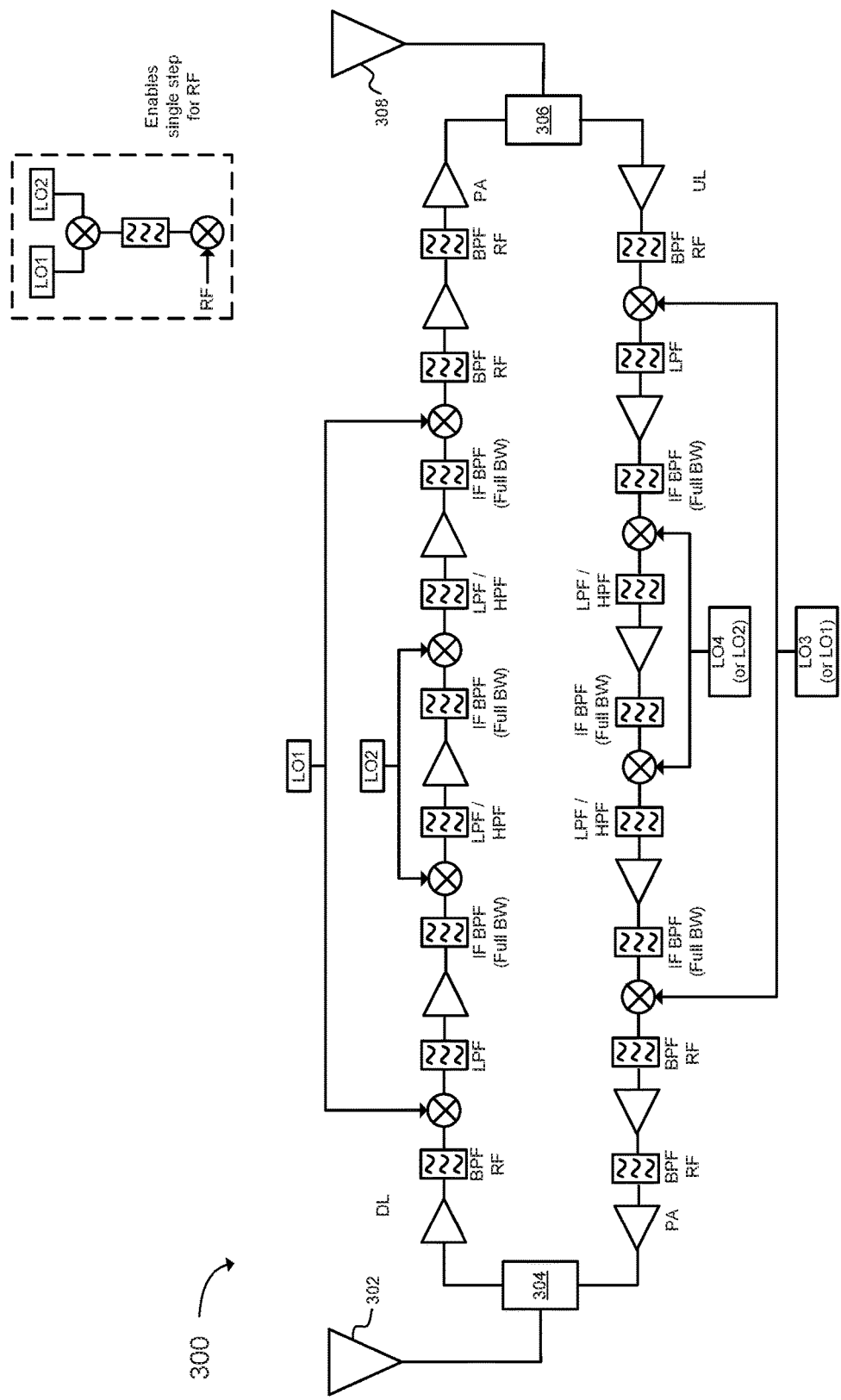
FIG. 3 illustrates a signal booster or repeater for performing variable bandwidth filtering of channelized signals in accordance with an example.

FIG. 3 illustrates an exemplary signal booster 300 or repeater for performing variable bandwidth filtering of channelized signals. The signal booster 300 can include an outside antenna 302 and an inside antenna 308. The outside antenna 302 can be communicatively coupled to a first duplexer 304, and the inside antenna 308 can be communicatively coupled to a second duplexer 306. In addition, a downlink signal path and an uplink signal path can be communicatively coupled between the first duplexer 304 and the second duplexer 306.

In one example, the downlink signal path and the uplink signal path can each include a plurality of filters and amplifiers that enable the signal booster 300 to perform variable bandwidth filtering and amplification of channelized signals. For example, the downlink signal path and the uplink signal path can each include amplifiers (e.g., LNAs, PAs), radio frequency (RF) bandpass filters, mixers, low pass filters (LPFs), full bandwidth intermediate frequency (IF) bandpass filters, and high pass filters (HPFs). On the downlink signal path, a first variable local oscillator (LO) (LO1) can be an input to specific mixers, and a second variable LO (LO2) can be an input to other specific mixers. On the uplink signal path, a third variable LO (LO3) (or LO1) can be an input to specific mixers, and a fourth variable LO (LO4) (or LO2) can be an input to other mixers. The mixers can be RF mixers with an R port, an L port and an I port. For the downlink and uplink signal paths, the combination of the HPFs and the LPFs in addition to the variable LOs can provide the signal booster 300 with an ability to perform variable bandwidth filtering of channelized signals.

In an alternative configuration, the downlink signal path and/or the uplink signal path can combine the first variable LO and the second variable LO and provide the combination of the first and second variable LOs to a mixer, which can result in a reduction in the number of subsequent mixers, LPFs, HPFs, full bandwidth IF bandpass filters, RF bandpass filters, etc. along the downlink and/or uplink signal paths. The combination of the first variable LO and the second variable LO can enable an RF signal to be converted to a first channelized signal at a first IF, and then to a second channelized signal at a second IF, and then back to the RF signal, rather than converting the second channelized signal at the second IF to a third channelized signal at the first IF and then to the RF signal.

Figure 4:
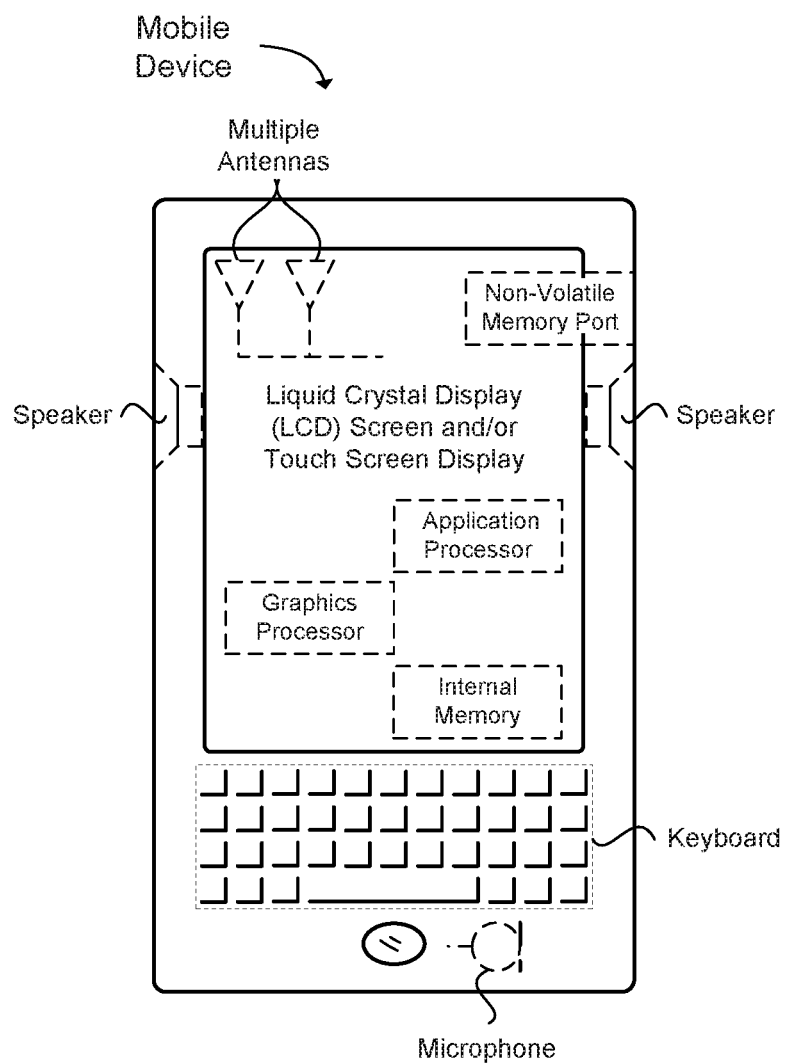
FIG. 4 illustrates a wireless device in accordance with an example.

FIG. 4 provides an example illustration of the wireless device, such as a user equipment (UE), a mobile station (MS), a mobile communication device, a tablet, a handset, a wireless transceiver coupled to a processor, or other type of wireless device. The wireless device can include one or more antennas configured to communicate with a node or transmission station, such as an access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 4 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes a repeater configured to perform variable bandwidth filtering of signals, the repeater comprising: a signal path for a radio frequency (RF) signal that includes: a fixed-bandwidth low pass filter (LPF) operable to perform a variable bandwidth filtering of the RF signal to produce a channelized signal, wherein the variable bandwidth filtering at the LPF is performed by adjusting a first variable local oscillator (LO); a fixed-bandwidth high pass filter (HPF) operable to perform a variable bandwidth filtering of a channelized signal output from the LPF, wherein the variable bandwidth filtering at the HPF is performed by adjusting a second variable LO, wherein the first variable LO and the second variable LO are set to create a variable bandwidth that enables the repeater to perform variable bandwidth filtering of the signals.

Example 2 includes the repeater of Example 1, wherein the signal path includes: a first full bandwidth RF filter that is positioned before the LPF; a full bandwidth intermediate frequency (IF) filter that is positioned before the LPF or after the HPF; and a second full bandwidth RF filter that is positioned after the HPF.

Example 3 includes the repeater of any of Examples 1 to 2, further comprising a first mixer to down convert an RF signal output from a first full bandwidth RF filter to form a signal at a first intermediate frequency using the first variable LO, wherein the signal at the first intermediate frequency is filtered using the LPF to form a first channelized signal at the first intermediate frequency based on a combination of a bandwidth of the LPF, an LO setting of the first variable LO, and a RF frequency.

Example 4 includes the repeater of any of Examples 1 to 3, further comprising a second mixer to convert a first channelized signal output from the LPF to form a signal at a second intermediate frequency using the second variable LO, wherein the signal at the second intermediate frequency is filtered using the HPF to form a second channelized signal at the second intermediate frequency based on a bandwidth of the HPF and an LO setting of the second variable LO.

Example 5 includes the repeater of any of Examples 1 to 4, further comprising: a third mixer to convert a second channelized signal output from the HPF to form a third channelized signal at a first intermediate frequency using the second variable LO, wherein the third channelized signal at the first intermediate frequency is filtered using a full bandwidth IF filter; and a fourth mixer to convert an output of the full bandwidth IF filter to form an RF signal at a carrier frequency using the first variable LO, wherein the RF signal at the carrier frequency is filtered using a second full bandwidth RF filter.

Example 6 includes the repeater of any of Examples 1 to 5, further comprising a third mixer to convert a second channelized signal output from the HPF to form an RF signal at a carrier frequency using the first variable LO and the second variable LO, wherein the RF signal at the carrier frequency is filtered using a second full bandwidth RF filter.

Example 7 includes the repeater of any of Examples 1 to 6, wherein the signal path is a directional signal path that includes a plurality of amplifiers to enable the repeater to perform variable channelized bandwidth amplification of the signals.

Example 8 includes the repeater of any of Examples 1 to 7, wherein the variable bandwidth filtering is associated with one or more of: a specific cellular carrier, a public safety service provider or a specific location.

Example 9 includes the repeater of any of Examples 1 to 8, wherein the signal path is communicatively coupled to a first duplexer of the repeater and a second duplexer of the repeater.

Example 10 includes the repeater of any of Examples 1 to 9, wherein the signal path is an uplink signal path or a downlink signal path.

Example 11 includes a repeater configured to perform variable bandwidth filtering of signals, the repeater comprising: a signal path for a radio frequency (RF) signal that includes: a first fixed-bandwidth intermediate frequency (IF) bandpass filter operable to perform a variable bandwidth filtering of the RF signal to produce a channelized signal, wherein the variable bandwidth filtering at the first fixed-bandwidth IF bandpass filter is performed by adjusting a first variable local oscillator (LO); and a second fixed-bandwidth IF bandpass filter operable to perform a variable bandwidth filtering of a channelized signal output from the first fixed-bandwidth IF bandpass filter, wherein the variable bandwidth filtering at the second fixed-bandwidth IF bandpass filter is performed by adjusting a second variable LO, wherein the first variable LO and the second variable LO are set to create a variable bandwidth that enables the repeater to perform variable bandwidth filtering of the signals.

Example 12 includes the repeater of Example 11, wherein the signal path includes: a first full bandwidth RF filter that is positioned before the first fixed-bandwidth IF bandpass filter; a full bandwidth intermediate frequency (IF) filter that is positioned before the first fixed-bandwidth IF bandpass filter or after the second fixed-bandwidth IF bandpass filter; and a second full bandwidth RF filter that is positioned after the second fixed-bandwidth IF bandpass filter.

Example 13 includes the repeater of any of Examples 11 to 12, further comprising a first mixer to down convert an RF signal output from a first full bandwidth RF filter to form a signal at a first intermediate frequency using the first variable LO, wherein the signal at the first intermediate frequency is filtered using the first fixed-bandwidth IF bandpass filter to form a first channelized signal based on a combination of a bandwidth of the first fixed-bandwidth IF bandpass filter, an LO setting of the first variable LO, and a RF frequency.

Example 14 includes the repeater of any of Examples 11 to 13, further comprising a second mixer to convert a first channelized signal output from the first fixed-bandwidth IF bandpass filter to form a signal at a second intermediate frequency using the second variable LO, wherein the signal at the second intermediate frequency is filtered using the second fixed-bandwidth IF bandpass filter to form a second channelized signal based on a bandwidth of the second fixed-bandwidth IF bandpass filter and an LO setting of the second variable LO.

Example 15 includes the repeater of any of Examples 11 to 14, further comprising: a third mixer to convert a second channelized signal output from the second fixed-bandwidth IF bandpass filter to form a third channelized signal at a first intermediate frequency using the second variable LO, wherein the third channelized signal at the first intermediate frequency is filtered using a full bandwidth IF filter; and a fourth mixer to convert an output of the full bandwidth IF filter to form an RF signal at a carrier frequency using the first variable LO, wherein the RF signal at the carrier frequency is filtered using a second full bandwidth RF filter.

Example 16 includes the repeater of any of Examples 11 to 15, further comprising a third mixer to convert a second channelized signal output from the second fixed-bandwidth IF bandpass filter to form an RF signal at a carrier frequency using the first variable LO and the second variable LO, wherein the RF signal at the carrier frequency is filtered using a second full bandwidth RF filter.

Example 17 includes the repeater of any of Examples 11 to 16, wherein the signal path is a directional signal path that includes a plurality of amplifiers to enable the repeater to perform variable channelized bandwidth amplification of the signals.

Example 18 includes the repeater of any of Examples 11 to 17, wherein the variable bandwidth filtering is associated with one or more of: a specific cellular carrier, a public safety service provider or a specific location.

Example 19 includes the repeater of any of Examples 11 to 18, wherein the signal path is communicatively coupled to a first duplexer of the repeater and a second duplexer of the repeater.

Example 20 includes the repeater of any of Examples 11 to 19, wherein the signal path is an uplink signal path or a downlink signal path.

Example 21 includes a repeater configured to perform variable bandwidth filtering of signals, the repeater comprising: a directional signal path for a radio frequency (RF) signal that includes: a fixed-bandwidth high pass filter (HPF) operable to perform a variable bandwidth filtering of the RF signal to produce a channelized signal, wherein the variable bandwidth filtering at the HPF is performed by adjusting a first variable local oscillator (LO); a fixed-bandwidth low pass filter (LPF) operable to perform a variable bandwidth filtering of a channelized signal output from the HPF, wherein the variable bandwidth filtering at the LPF is performed by adjusting a second variable LO, wherein the first variable LO and the second variable LO are set to create a variable bandwidth that enables the repeater to perform variable bandwidth filtering of the signals.

Example 22 includes the repeater of Example 21, wherein the directional signal path includes: a first full bandwidth RF filter that is positioned before the HPF; a full bandwidth intermediate frequency (IF) filter that is positioned before the HPF or after the LPF; and a second full bandwidth RF filter that is positioned after the LPF.

Example 23 includes the repeater of any of Examples 21 to 22, further comprising a first mixer to down convert an RF signal output from a first full bandwidth RF filter to form a signal at a first intermediate frequency using the first variable LO, wherein the signal at the first intermediate frequency is filtered using the HPF to form a first channelized signal based on a combination of a bandwidth of the HPF, an LO setting of the first variable LO, and a RF frequency.

Example 24 includes the repeater of any of Examples 21 to 23, further comprising a second mixer to convert a first channelized signal output from the HPF to form a signal at a second intermediate frequency using the second variable LO, wherein the signal at the second intermediate frequency is filtered using the LPF to form a second channelized signal based on a bandwidth of the LPF and an LO setting of the second variable LO.

Example 25 includes the repeater of any of Examples 21 to 24, further comprising: a third mixer to convert a second channelized signal output from the LPF to form a third channelized signal at a first intermediate frequency using the second variable LO, wherein the third channelized signal at the first intermediate frequency is filtered using a full bandwidth IF filter; and a fourth mixer to convert an output of the full bandwidth IF filter to form an RF signal at a carrier frequency using the first variable LO, wherein the RF signal at the carrier frequency is filtered using a second full bandwidth RF filter.

Example 26 includes the repeater of any of Examples 21 to 25, further comprising a third mixer to convert a second channelized signal output from the LPF to form an RF signal at a carrier frequency using the first variable LO and the second variable LO, wherein the RF signal at the carrier frequency is filtered using a second full bandwidth RF filter.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A repeater configured to perform variable bandwidth filtering of signals, the repeater comprising:
   a signal path for a radio frequency (RF) signal that includes:
   a fixed-bandwidth low pass filter (LPF) operable to perform a variable bandwidth filtering of the RF signal to produce a channelized signal, wherein the variable bandwidth filtering at the LPF is performed by adjusting a first variable local oscillator (LO); and
   a fixed-bandwidth high pass filter (HPF) operable to perform a variable bandwidth filtering of a channelized signal output from the LPF, wherein the variable bandwidth filtering at the HPF is performed by adjusting a second variable LO,
   wherein the first variable LO and the second variable LO are set to enable the repeater to perform variable bandwidth filtering of the signals using only the first variable LO and the second variable LO.

2. The repeater of claim 1, wherein the signal path includes:
   a first full bandwidth RF filter that is positioned before the LPF;
   a full bandwidth intermediate frequency (IF) filter that is positioned before the LPF or after the HPF; and
   a second full bandwidth RF filter that is positioned after the HPF.

3. The repeater of claim 1, further comprising a first mixer to down convert an RF signal output from a first full bandwidth RF filter to form a signal at a first intermediate frequency using the first variable LO, wherein the signal at the first intermediate frequency is filtered using the LPF to form a first channelized signal at the first intermediate frequency based on a combination of a bandwidth of the LPF, an LO setting of the first variable LO, and a RF frequency.

4. The repeater of claim 1, further comprising a second mixer to convert a first channelized signal output from the LPF to form a signal at a second intermediate frequency using the second variable LO, wherein the signal at the second intermediate frequency is filtered using the HPF to form a second channelized signal at the second intermediate frequency based on a bandwidth of the HPF and an LO setting of the second variable LO.

5. The repeater of claim 1, further comprising:
   a third mixer to convert a second channelized signal output from the HPF to form a third channelized signal at a first intermediate frequency using the second variable LO, wherein the third channelized signal at the first intermediate frequency is filtered using a full bandwidth IF filter; and
   a fourth mixer to convert an output of the full bandwidth IF filter to form an RF signal at a carrier frequency using the first variable LO, wherein the RF signal at the carrier frequency is filtered using a second full bandwidth RF filter.

6. The repeater of claim 1, further comprising a third mixer to convert a second channelized signal output from the HPF to form an RF signal at a carrier frequency using the first variable LO and the second variable LO, wherein the RF signal at the carrier frequency is filtered using a second full bandwidth RF filter.

7. The repeater of claim 1, wherein the signal path is a directional signal path that includes a plurality of amplifiers to enable the repeater to perform variable channelized bandwidth amplification of the signals.

8. The repeater of claim 1, wherein the variable bandwidth filtering is associated with one or more of: a specific cellular carrier, a public safety service provider or a specific location.

9. The repeater of claim 1, wherein the signal path is communicatively coupled to a first duplexer of the repeater and a second duplexer of the repeater.

10. The repeater of claim 1, wherein the signal path is an uplink signal path or a downlink signal path.

11. The repeater of claim 1, wherein:
   the first variable LO is configured to convert the RF signal to a signal with a first intermediate frequency (IF) to enable filtering of the signal with the first IF using the LPF;
   the second variable LO is configured to convert the signal with the first IF to the signal with a second IF to enable filtering of the signal with the second IF using the HPF to provide the variable bandwidth filtering;
   the second variable LO is configured to convert the signal with the second IF to the signal with the first IF; and
   the first variable LO is configured to convert the signal with the first IF to the RF signal.

12. A repeater configured to perform variable bandwidth filtering of signals, the repeater comprising:
   a signal path for a radio frequency (RF) signal that includes:
   a first fixed-bandwidth intermediate frequency (IF) bandpass filter operable to perform a variable bandwidth filtering of the RF signal to produce a channelized signal, wherein the variable bandwidth filtering at the first fixed-bandwidth IF bandpass filter is performed by adjusting a first variable local oscillator (LO); and
   a second fixed-bandwidth IF bandpass filter operable to perform a variable bandwidth filtering of a channelized signal output from the first fixed-bandwidth IF bandpass filter, wherein the variable bandwidth filtering at the second fixed-bandwidth IF bandpass filter is performed by adjusting a second variable LO,
   wherein the first variable LO and the second variable LO are set to create a variable bandwidth that enables the repeater to perform variable bandwidth filtering of the signals using only the first variable LO and the second variable LO.

13. The repeater of claim 12, wherein the signal path includes:
   a first full bandwidth RF filter that is positioned before the first fixed-bandwidth IF bandpass filter;
   a full bandwidth intermediate frequency (IF) filter that is positioned before the first fixed-bandwidth IF bandpass filter or after the second fixed-bandwidth IF bandpass filter; and
   a second full bandwidth RF filter that is positioned after the second fixed-bandwidth IF bandpass filter.

14. The repeater of claim 12, further comprising a first mixer to down convert an RF signal output from a first full bandwidth RF filter to form a signal at a first intermediate frequency using the first variable LO, wherein the signal at the first intermediate frequency is filtered using the first fixed-bandwidth IF bandpass filter to form a first channelized signal based on a combination of a bandwidth of the first fixed-bandwidth IF bandpass filter, an LO setting of the first variable LO, and a RF frequency.

15. The repeater of claim 12, further comprising a second mixer to convert a first channelized signal output from the first fixed-bandwidth IF bandpass filter to form a signal at a second intermediate frequency using the second variable LO, wherein the signal at the second intermediate frequency is filtered using the second fixed-bandwidth IF bandpass filter to form a second channelized signal based on a bandwidth of the second fixed-bandwidth IF bandpass filter and an LO setting of the second variable LO.

16. The repeater of claim 12, further comprising:
   a third mixer to convert a second channelized signal output from the second fixed-bandwidth IF bandpass filter to form a third channelized signal at a first intermediate frequency using the second variable LO, wherein the third channelized signal at the first intermediate frequency is filtered using a full bandwidth IF filter; and
   a fourth mixer to convert an output of the full bandwidth IF filter to form an RF signal at a carrier frequency using the first variable LO, wherein the RF signal at the carrier frequency is filtered using a second full bandwidth RF filter.

17. The repeater of claim 12, further comprising a third mixer to convert a second channelized signal output from the second fixed-bandwidth IF bandpass filter to form an RF signal at a carrier frequency using the first variable LO and the second variable LO, wherein the RF signal at the carrier frequency is filtered using a second full bandwidth RF filter.

18. The repeater of claim 12, wherein the signal path is a directional signal path that includes a plurality of amplifiers to enable the repeater to perform variable channelized bandwidth amplification of the signals.

19. The repeater of claim 12, wherein the variable bandwidth filtering is associated with one or more of: a specific cellular carrier, a public safety service provider or a specific location.

20. The repeater of claim 12, wherein the signal path is communicatively coupled to a first duplexer of the repeater and a second duplexer of the repeater.

21. The repeater of claim 12, wherein the signal path is an uplink signal path or a downlink signal path.

22. The repeater of claim 12, wherein:
   the first variable LO is configured to convert the RF signal to a signal with a first IF to enable filtering of the signal with the first IF using the first fixed-bandwidth IF bandpass filter;
   the second variable LO is configured to convert the signal with the first IF to the signal with a second IF to enable filtering of the signal with the second IF using the second fixed-bandwidth IF bandpass filter to provide the variable bandwidth filtering;
   the second variable LO is configured to convert the signal with the second IF to the signal with the first IF; and
   the first variable LO is configured to convert the signal with the first IF to the RF signal.

23. A repeater configured to perform variable bandwidth filtering of signals, the repeater comprising:
   a directional signal path for a radio frequency (RF) signal that includes:
   a fixed-bandwidth high pass filter (HPF) operable to perform a variable bandwidth filtering of the RF signal to produce a channelized signal, wherein the variable bandwidth filtering at the HPF is performed by adjusting a first variable local oscillator (LO); and
   a fixed-bandwidth low pass filter (LPF) operable to perform a variable bandwidth filtering of a channelized signal output from the HPF, wherein the variable bandwidth filtering at the LPF is performed by adjusting a second variable LO,
   wherein the first variable LO and the second variable LO are set to create a variable bandwidth that enables the repeater to perform variable bandwidth filtering of the signals using only the first variable LO and the second variable LO.

24. The repeater of claim 23, wherein the directional signal path includes:
   a first full bandwidth RF filter that is positioned before the HPF;
   a full bandwidth intermediate frequency (IF) filter that is positioned before the HPF or after the LPF; and
   a second full bandwidth RF filter that is positioned after the LPF.

25. The repeater of claim 23, further comprising a first mixer to down convert an RF signal output from a first full bandwidth RF filter to form a signal at a first intermediate frequency using the first variable LO, wherein the signal at the first intermediate frequency is filtered using the HPF to form a first channelized signal based on a combination of a bandwidth of the HPF, an LO setting of the first variable LO, and a RF frequency.

26. The repeater of claim 23, further comprising a second mixer to convert a first channelized signal output from the HPF to form a signal at a second intermediate frequency using the second variable LO, wherein the signal at the second intermediate frequency is filtered using the LPF to form a second channelized signal based on a bandwidth of the LPF and an LO setting of the second variable LO.

27. The repeater of claim 23, further comprising:
   a third mixer to convert a second channelized signal output from the LPF to form a third channelized signal at a first intermediate frequency using the second variable LO, wherein the third channelized signal at the first intermediate frequency is filtered using a full bandwidth IF filter; and
   a fourth mixer to convert an output of the full bandwidth IF filter to form an RF signal at a carrier frequency using the first variable LO, wherein the RF signal at the carrier frequency is filtered using a second full bandwidth RF filter.

28. The repeater of claim 23, further comprising a third mixer to convert a second channelized signal output from the LPF to form an RF signal at a carrier frequency using the first variable LO and the second variable LO, wherein the RF signal at the carrier frequency is filtered using a second full bandwidth RF filter.

29. The repeater of claim 23, wherein:
   the first variable LO is configured to convert the RF signal to a signal with a first intermediate frequency (IF) to enable filtering of the signal with the first IF using the HPF;
   the second variable LO is configured to convert the signal with the first IF to the signal with a second IF to enable filtering of the signal with the second IF using the LPF to provide the variable bandwidth filtering;
   the second variable LO is configured to convert the signal with the second IF to the signal with the first IF; and
   the first variable LO is configured to convert the signal with the first IF to the RF signal.

30. A repeater configured to perform variable bandwidth filtering of signals, the repeater comprising:
  a signal path for a radio frequency (RF) signal that includes:
    a first fixed-bandwidth filter operable to perform a variable bandwidth filtering of the RF signal to produce a channelized signal, wherein the variable bandwidth filtering at the first fixed-bandwidth filter is performed by adjusting a first variable local oscillator (LO);
    a second fixed-bandwidth filter operable to perform a variable bandwidth filtering of a channelized signal output from the first fixed-bandwidth filter, wherein the variable bandwidth filtering at the second fixed-bandwidth filter is performed by adjusting a second variable LO; and
    a first mixer to convert a second channelized signal output from the second fixed-bandwidth filter to form an RF signal at a carrier frequency using the first variable LO and the second variable LO, wherein the RF signal at the carrier frequency is filtered using a first full bandwidth RF filter,
  wherein the first variable LO and the second variable LO are set to enable the repeater to perform variable bandwidth filtering of the signals; and
  wherein:
    the first fixed-bandwidth filter is a low pass filter (LPF) and the second fixed-bandwidth filter is a high pass filter (HPF); or
    the first fixed-bandwidth filter is an HPF and the second fixed-bandwidth filter is an LPF; or
    the first fixed-bandwidth filter is a first fixed-bandwidth intermediate frequency (IF) bandpass filter, and the second fixed-bandwidth filter is a second fixed-bandwidth IF bandpass filter.

31. The repeater of claim 30, wherein:
  the first variable LO is configured to convert the RF signal to a signal with a first IF to enable filtering of the signal with the first IF using the first fixed-bandwidth filter;
  the second variable LO is configured to convert the signal with the first IF to the signal with a second IF to enable filtering of the signal with the second IF using the second fixed-bandwidth filter to provide the variable bandwidth filtering;
  the second variable LO is configured to convert the signal with the second IF to the signal with the first IF; and
  the first variable LO is configured to convert the signal with the first IF to the RF signal.

32. The repeater of claim 30, wherein the signal path for the RF signal is a directional signal path.

33. The repeater of claim 30, wherein the first variable LO and the second variable LO are set to create a variable bandwidth that enables the repeater to perform the variable bandwidth filtering of the signals.

* * * * *